Oct. 17, 1950  H. M. GREENE  2,525,897
WELL PIPE FILTER
Filed March 1, 1948
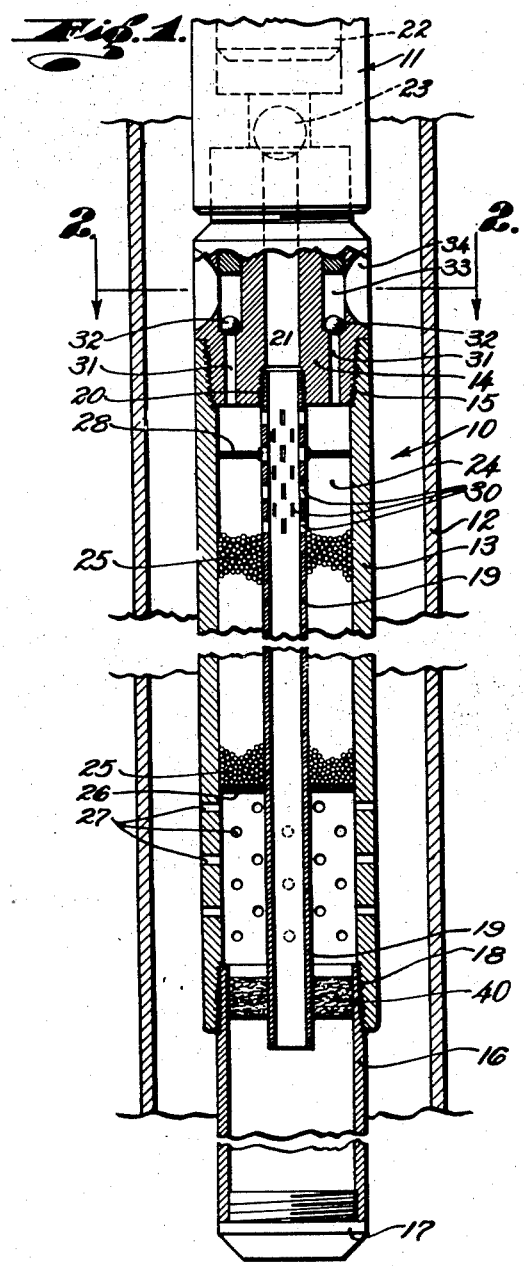
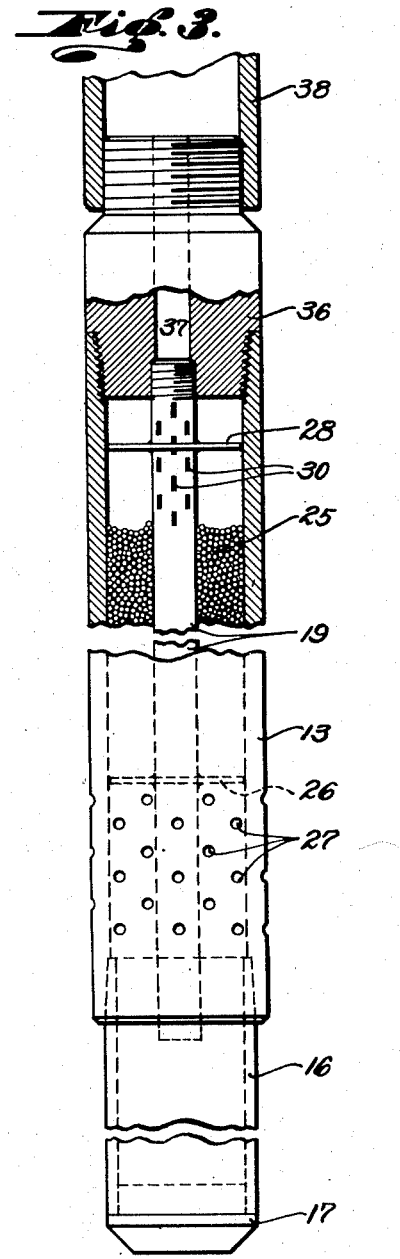
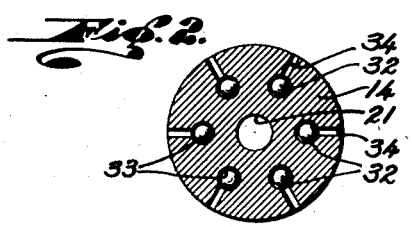
HASKELL M. GREENE
INVENTOR.
BY
ATTORNEY Patented Oct. 17, 1950

2,525,897

UNITED STATES PATENT OFFICE 2,525,897

WELL PIPE FILTER

Haskell M. Greene, Whittier, Calif.

Application March 1, 1948, Serial No. 12,382

15 Claims. (Cl. 103—220)

This invention has to do generally with improved filter assemblies to be used in association with liquid or gas production pipe strings, primarily as applied to liquid production, to separate solids and entrained gases from the liquid, and in the case of gas production, to control the flow rate and filter the gas. The invention has particular applicability to oil well production, and will be described typically in that adaptation.

Heretofore it has been common practice to flow the well fluid into the production string through gravel beds deposited in the well about the perforated casing or liner, or in "prepacked" form carried by the liner. Ordinarily, the well fluid flow occurs transversely through an elongated filter bed, and therefore through a course within the filtering material that is relatively short by reason of the limitations which the well and pipe diameters place upon the transverse dimension of the filter bed. Also the bed particles are held against displacement because of their compact relation in the direction of fluid flow transversely through the bed. Because of these limitations, the filtering medium has a tendency toward early accumulation and retention of sand particles, with resultant clogging and reduction of production.

One of my major objects is to provide a filter bed assembly whereby the production flow is directed longitudinally through the filter bed, or longitudinally through a passage between annularly spaced tubular sections containing a bed of filtering material. In this manner the required path of flow through the material is greatly extended, with resultant more complete filtering action with respect to all fluids, and ability to utilize the extended filtering flow path to maintain control over the rate of gas production.

The invention further contemplates maintenance of the filter bed in a condition, particularly with relation to the direction of fluid flow, permitting displacement or agitation of the bed particles so that the bed becomes self-cleaning in the sense that said particles are permitted to be carried on for separation beyond the bed.

Another important object of the invention is the use of the filter assembly in combination with a well pump, and the functional association of the filter and pump permitting separation from the well liquid of entrained gases and solid particles in advance of the liquid flow into the pump, so that the usual difficulties due to sanding and gas-locking of the pump are eliminated.

With particular regard to the composition of the filter bed, the invention aims to provide an improved filtering medium composed of glass spheres having the advantages of accurate size predeterminability, surface smoothness, and electrical non-conductivity, the latter property being especially important because of charge effects tendency to repel adherence of foreign particles to the glass spheres, and the tendency of the bed mass to reduce electrolytic actions on the metal parts.

The above mentioned features and objects, as well as the details of certain illustrative embodiments of the invention, will be more fully understood from the following description of the accompanying drawing, in which:

Fig. 1 is a sectional view showing the filter assembly in association with a well pump;

Fig. 2 is a cross section through the filter structure head, on line 2—2 of Fig. 1; and Fig. 3 is a view similar to Fig. 1 illustrating a variational form of the invention.

Referring first to Fig. 1, the filter assembly, generally indicated at 10, is shown to be connected to a usual type of reciprocating plunger well pump 11, which, as will be understood without necessity for specific illustration, displaces the well liquid upwardly to the surface through the production tubing or pipe string, not shown. At this point it may be mentioned that when used in association with the filter assembly 10, a well pump is to be regarded as a portion of the production string, not shown, running up through the well casing 12.

The filter assembly 10 comprises a tubular body 13 having a head structure 14 attached to the tube 13 as by threaded joint at 15. The body includes a lower tubular length 16 closed at its lower end, as by removable plug 17, and having a threaded connection at 18 with tube 13. An internal tube 19 angularly spaced from the body section 13, is connected at 20 with the head 14, and is in communication with the central head passage or bore 21 through which the pump 11 takes suction during the upstroke of its piston 22, past the usual downwardly seating check valve 23.

The elongated space 24 between tubes 13 and 19 contains a vertically extended bed of filtering material 25 resting upon a suitable apertured support 26 above a series of perforations 27 in the tube 13. Upward displacement of the filter bed material out of space 24 is prevented by an apertured baffle 28. As illustrated, pipes 13 and 19 are imperforate throughout an extended length or depth of the filter bed 25, so that the fluid flow is confined for passage longitudinally through the filter bed to the elevation of perforations 30 in the upper portion of tube 19, through which the fluid passes to the pump.

The head 14 contains a circular series of passages 31 through which gas escapes past appropriate check valves, conventionally indicated at 32, acting to prevent return fluid flow from the well into space 24. Beyond the check valves, the gas escapes to the well through bores 33 and the lateral openings 34.

As previously indicated, the filter bed 25 preferably is composed of a mass of glass spheres having around ¼ inch diameter. Presenting smooth spherical surfaces, the filter bed particles define interstitial spaces of corresponding and exactly predeterminable uniformity, to considerable advantage with respect to both the space uniformity and reduced tendency of the sphere surfaces to accumulate foreign bodies, over the conventional gravels and like materials customarily employed. It appears that the non-conductivity of glass spheres tends to maintain a surface charge condition repellent to foreign and otherwise adhering particles, the non-conductivity of the spheres further tending to reduce electrolytic deterioration of the metallic tubular parts of the assembly.

In considering operation during the upstroke of the pump plunger 22, the liquid is taken into the body 13 through apertures 27, and directed upwardly through the filter bed 25 to pass through openings 30 and passage 21 past check valve 23 into the pump. Being unconfined at its top surface, the filter bed particles are capable of displacement or agitation so that the spheres tend to free themselves from otherwise adhering bodies. Any sand particles carried by the liquid through apertures 30 into the tube 19 tend to settle out of the liquid and drop through the tube into the collecting chamber formed by the lower body section 16.

Upon reversal of the pump plunger stroke, a certain amount of fluid slippage occurs by reason of the known tendency of the check valve 23 to remain unseated for an instant at just the start of the plunger down stroke. As a result, a short pressure down surge is transmitted through passage 21 to the space 24. During passage of the liquid upwardly through the bed 25, the gas tends to separate by reason of the division and surface contact to which the liquid is exposed. Accordingly, when the liquid reaches the space 24 above the filter bed, the gas tends to rise and separate toward the head 14. The pressure down surge created by the pump plunger, as explained, tends to displace the gas outwardly through passages 31 past the check valves 32, thus eliminating from the liquid stream gas which would otherwise gas-lock the pump.

Fig. 3 illustrates a variational form of the invention adaptable to gas production strings, i. e., the flow pipe of a well producing substantially only gas. Here the structure and relation of the body parts 13 and 16, the inner tube 19 and filter bed 25 are the same as the correspondingly designated parts previously described. The head 36 in this instance contains a passage 37 through which gas entering the tube 19 flows to the production string 38 attached to the head. Gas entering the perforations 27 flows upwardly through the filter bed 25 and then through apertures 30 for delivery to the ground surface.

As applied to a gas production string, the filter assembly may serve in addition to cleansing the gas, the further function of controlling or limiting its rate of production. By adjusting such variables as the vertical extent of the filter bed and the side of its particles, the maximum rate of gas flow through the bed may be increased or decreased to maintain a production limit at the top of the well. Being positioned deep in the well, the filter assembly is unaffected by such conditions as compressor-created pulsations which frequently interfere with other expedients for flow regulation at the well head, the control afforded by the filter bed further being maintainable without unauthorized changes, as is possible where the controls are accessible at the top of the well.

While the invention broadly contemplates the use of any suitable filtering material to form the bed 25, it is especially desirable that such material be non-magnetic, typically and preferably in the form of glass spheres. By reason of the action and displaceability of the bed particles, particularly effective separation of sand from adhering material is effected. Commonly the sand grains carry shale and waxy particles which tend to keep the sand suspended in the liquid. Passing through the filter bed, these non-silica particles are separated from the mud, freeing the latter for separation and settling out in the tube 19.

Should it be found desirable to positively confine the fluid entering the body through perforations 27, for upward flow through the filter bed, excluding the possibility of any portion of the fluid by-passing the filter bed by upward flow through the tube 19, suitable provision may be made for closing the space between pipe 19 and the body below the perforations. As illustrative, such closure may be effected by a removable plug 40.

I claim:

1. A well pump sand and gas filtering attachment, comprising a tubular body connectible to the bottom of a well pump and containing a chamber, a mobile mass of interengaging filter particles within said chamber, means directing liquid and gaseous well fluid through said mass and upwardly through the body to be taken by the pump, said particles being subject to agitation by reverse downward fluid surges into the chamber and acting to promote separation of gas from the liquid flowing through the chamber, and means forming an escape passage for discharging to the exterior of said body gas separating from the liquid after its passage through said particle mass.

2. A well pump sand and gas filtering attachment, comprising a tubular body connectible to the bottom of a well pump and containing a chamber, a mobile mass of interengaging ceramic spheres within said chamber, means directing liquid and gaseous well fluid through said mass and upwardly through the body to be taken by the pump, said spheres being subjected to agitation by reverse downward fluid surges into the chamber and acting to promote separation of gas from the liquid flowing through the chamber, and means forming an escape passage for discharging to the exterior of said body gas separating from the liquid after its passage through said mass of spheres.

3. A well pump sand and gas filtering attachment, comprising a tubular body connectible to the bottom of a well pump and containing a chamber, a mobile mass of interengaging ceramic spheres within said chamber, means confining liquid and gaseous well fluid flow entering the lower portion of the body in a path upwardly through said mass and thence upwardly through a separating space and out of the body to be taken by the pump, said spheres being subjected to agitation by reverse downward fluid surges into the chamber and acting to promote separation of gas from the liquid flowing through the chamber, and means forming an escape passage for discharging to the exterior of said body gas separating from the liquid in said space.

4. A well pump sand and gas filtering attachment, comprising a tubular body connectible to the bottom of a well pump and containing a chamber, a mobile mass of interengaging filter particles within said chamber, means directing liquid and gaseous well fluid through said mass and upwardly through the body to be taken by the pump, said particles being subject to agitation by reverse downward fluid surges into the chamber and acting to promote separation of gas from the liquid flowing through the chamber, means forming an escape passage for discharging to the exterior of said body gas separating from the liquid after its passage through said particle mass, and a check valve preventing return fluid flow through said escape passage.

5. A well pump sand and gas filtering attachment, comprising a tubular body connectible to the bottom of a well pump and containing a chamber, a mobile mass of interengaging ceramic spheres within said chamber, means confining liquid and gaseous well fluid flow entering the lower portion of the body in a path upwardly through said mass and thence upwardly through a separating space and out of the body to be taken by the pump, said spheres being subjected to agitation by reverse downward fluid surges into the chamber and acting to promote separation of gas from the liquid flowing through the chamber, means forming an escape passage for discharging to the exterior of said body gas separating from the liquid in said space, and a check valve preventing return fluid flow through said passage into said space.

6. A well pump sand and gas filtering attachment, comprising a body including a head attachable to a well pump and a tubular portion extending from and below the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges into the mass and acting to promote separation of gas from the liquid flowing therethrough, and a check valve in said head past which gas escapes from said space into the well.

7. The combination claimed in claim 6 in which said filter particles consist of glass spheres of approximately one quarter inch diameter.

8. A well pump sand and gas filtering attachment, comprising a body including a head attachable to a well pump and a tubular portion extending from and below the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges into the mass and acting to promote separation of gas from the liquid flowing therethrough, a check valve in said head past which gas escapes from said space into the well, and a tube connecting with said passage in the head and depending within said particle mass, said tube containing an aperture through which liquid flows from said space into the head passage.

9. A well pump sand and gas filtering attachment, comprising a body including a head attachable to a well pump and a tubular portion extending from and beolw the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges into the mass and acting to promote separation of gas from the liquid flowing therethrough, a check valve in said head past which gas escapes from said space into the well, and a tube connecting with said passage in the head and depending through said particle mass into a sand collecting chamber in said tubular body portion below said mass, said tube containing an aperture through which liquid flows from said space into the head passage.

10. The combination comprising a well pump having a bottom fluid inlet and operating to create a brief fluid surge downwardly and reversely through said inlet, a sand and gas filtering assembly attached to the bottom of the pump and comprising a tubular body containing a chamber, a mobile mass of interengaging filter particles within said chamber, means directing liquid and gaseous well fluid through said mass and upwardly through the body to be taken by the pump, said particles being subject to agitation by reverse downward fluid surges from the pump into the chamber and acting to promote separation of gas from the liquid flowing through the chamber, and means forming an escape passage for discharging to the exterior of said body gas separating from the liquid after its passage through said particle mass.

11. The combination comprising a well pump having a bottom fluid inlet and operating to create a brief fluid surge downwardly and reversely through said inlet, a sand and gas filtering assembly attached to the bottom of the pump and comprising a tubular body containing a chamber, a mobile mass of interengaging ceramic spheres within said chamber, means directing liquid and gaseous well fluid through said mass and upwardly through the body to be taken by the pump, said spheres being subject to agitation by reverse downward fluid surges from the pump into the chamber and acting to promote separation of gas from the liquid flowing through the chamber, and means forming an escape passage for discharging to the exterior of said body gas separating from the liquid after its passage through said mass of spheres.

12. The combination comprising a well pump having a bottom fluid inlet and operating to create a brief fluid surge downwardly and reversely through said inlet, a sand and gas filtering assembly attached to the bottom of the pump and comprising a tubular body containing a chamber, a mobile mass of interengaging filter particles within said chamber, means confining liquid and gaseous well fluid flow entering the lower portion of the body in a path upwardly through said mass and thence upwardly through a separating space and out of the body to be taken by the pump, said particles being subject to agitation by reverse downward fluid surges into the chamber and acting to promote separation of gas from the liquid flowing through the chamber, and means forming an escape passage for discharging to the exterior of said body gas separating from the liquid in said space.

13. The combination comprising a well pump having a bottom fluid inlet and operating to create a brief fluid surge downwardly and reversely through the inlet, a sand and gas filtering body including a head attached to the bottom of the pump and a tubular portion extending from and below the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges from the pump into the mass and acting to promote separation of gas from the liquid flowing therethrough, and a check valve in said head past which gas escapes from said space into the well.

14. The combination comprising a well pump having a bottom fluid inlet and operating to create a brief fluid surge downwardly and reversely through the inlet, a sand and gas filtering body including a head attached to the bottom of the pump and a tubular portion extending from and below the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges from the pump into the mass and acting to promote separation of gas from the liquid flowing therethrough, a check valve in said head past which gas escapes from said space into the well, and a tube connecting with said passage in the head and depending within said particle mass, said tube containing an aperture through which liquid flows from said space into the head passage.

15. The combination comprising a well pump having a bottom fluid inlet and operating to create a brief fluid surge downwardly and reversely through the inlet, a sand and gas filtering body including a head attached to the bottom of the pump and a tubular portion extending from and below the head, a mobile mass of interengaging filter particles within said tubular portion, means directing liquid and gaseous well fluid through said mass, the fluid thence passing upwardly through a separating space and a passage in the head to be taken by the pump, said particles being subject to agitation by reverse downward fluid surges from the pump into the mass and acting to promote separation of gas from the liquid flowing therethrough, a check valve in said head past which gas escapes from said space into the well, and a tube connecting with said passage in the head and depending through said particle mass into a sand collecting chamber in said tubular body portion below said mass, said tube containing an aperture through which liquid flows from said space into the head passage.

HASKELL M. GREENE.

REFERENCES CITED

The following references are of record in the file of this patent:

UNITED STATES PATENTS

| Number | Name | Date |
| --- | --- | --- |
| 736,444 | Putzeys | Aug. 18, 1903 |
| 1,548,803 | Cotton | Aug. 4, 1925 |
| 1,554,835 | Barrett | Sept. 22, 1925 |
| 1,604,386 | Byerly | Oct. 26, 1926 |
| 1,757,267 | Stanley | May 6, 1930 |